United States Patent [19]

Muir et al.

[11] Patent Number: 4,824,584

[45] Date of Patent: Apr. 25, 1989

[54] ONE-STEP PROCESS FOR PREPARATION OF THIXOTROPIC OVERBASED CALCIUM SULFONATE COMPLEX THICKENED COMPOSITIONS

[75] Inventors: Ron Muir, West Hall, Canada; Kevin L. Mulrooney, Glen Rock, N.J.

[73] Assignee: Witco Corporation, New York, N.Y.

[21] Appl. No.: 108,629

[22] Filed: Oct. 15, 1987

[51] Int. Cl.$^4$ .......................................... C10M 105/12
[52] U.S. Cl. ...................................... 252/39; 252/38; 252/32
[58] Field of Search .................. 252/33, 33.2, 33.3, 252/32.7 E, 33.4, 39, 18

[56] References Cited

U.S. PATENT DOCUMENTS

| | | | |
|---|---|---|---|
| 3,830,739 | 8/1974 | Kemp | 252/33.4 |
| 4,086,170 | 4/1978 | DeClippeleir | 252/33 |
| 4,206,062 | 6/1980 | Derbyshire | 252/33.2 |
| 4,597,880 | 7/1986 | Eliades | 252/33.4 |

Primary Examiner—William R. Dixon, Jr.
Assistant Examiner—James M. Hunter, Jr.
Attorney, Agent, or Firm—Wallenstein, Wagner, Hattis & Strampel, Ltd.

[57] ABSTRACT

An improved 1-step process is disclosed for the preparation of thixotropic overbased calcium sulfonate complex thickened compositions containing calcium sulfonate as the dispersing agent and containing $CaCO_3$ in the form of calcite crystals in colloidal or extremely finely divided form.

23 Claims, No Drawings

ONE-STEP PROCESS FOR PREPARATION OF THIXOTROPIC OVERBASED CALCIUM SULFONATE COMPLEX THICKENED COMPOSITIONS

FIELD OF THE INVENTION

Our present application is directed to an improved 1-step process for the preparation of thixotropic (or non-Newtonian) overbased calcium sulfonate complex thickened compositions which are generally in the form of greases or gels or pastes or other thickened forms. The thixotropic compositions of the present invention are of the heretofore known type which comprises, advantageously, a volatile and/or nonvolatile liquid carrier or solvent, such as, for example, Varsol or mineral spirits, or a mineral oil or equivalent oil or synthetic oil medium in their production, and oil-soluble calcium sulfonates derived from oil-soluble higher molecular weight sulfonic acids, which thickened compositions also contain, dispersed therein, calcium carbonate as calcite crystals in colloidal or extremely finely divided form. In acordance with our invention, while such types of thickened compositions have heretofore been prepared by what is known to the art as a 1-step process, such 1-step processes, as heretofore known and practiced, even as to the best of them, have had certain deficiencies which are overcome by our present invention.

BACKGROUND OF THE INVENTION AND BRIEF DESCRIPTION OF THE PRIOR ART

Thixotropic overbased calcium sulfonate complex thickened compositions having corrosion-inhibiting properties, and having utility, as such, or as ingredients of corrosion-inhibiting compositions, for a variety of uses such as, for instance, in automobile and truck body undercoatings, and for numerous other purposes, are known to the art and are disclosed in various publications and patents, illustrative of which are U.S. Pat. Nos. 3,242,079; 3,372,115; 3,376,222; 3,377,283; 3,523,898; 3,661,622; 3,671,012; 3,746,643; 3,730,895; 3,816,310; 3,492,231; 4,597,880; and Canadian Pat. No. 949,055. Such thickened compositions have gone into widespread use either as such, or, more commonly, admixed with other ingredients to produce compositions for use in a variety of environments, and, generally speaking, they are characterized by reasonably good E. P. and antiwear properties, high dropping points, reasonably good resistance to mechanical breakdown, salt spray and water-corrosion resistance, thermal stability at high temperatures, and other desirable properties, as described in the aforesaid patents. Such heretofore known thickened compositions are conventionally commercially prepared by what is known as a 2-step process, as more particularly shown in the aforesaid U.S. Pat. Nos. 3,242,079; 3,372,115; and 3,492,231. They have also been commercially prepared by what is known as a 1-step process, as noted above, and as is shown, for instance, in the aforementioned U.S. Pat. Nos. 3,761,012; 3,746,643; 3,816,310; 4,597,880; and Canadian Pat. No. 949,055 which also discloses heretofore known 2-step processes. The aforementioned U.S. Pat. No. 4,597,880 describes and identifies numbers of known 2-step processes and sets out the nature thereof and acknowledges the previously recognized delineations between 2-step processes and 1-step processes. Our present invention, as indicated above, is directed to the art dealing with 1-step processes and is concerned with a novel 1-step process which is characterized by marked and significant improvements and advantages over what, in our consideration, is, overall, the best of the heretofore known 1-step processes of which we are aware, namely, that of the aforementioned U.S. Pat. No. 4,597,880, for the preparation of thixotropic overbased calcium sulfonate complexes in the form of thickened compositions, generally in the form of greases.

U.S. Pat. No. 3,746,643 discloses a 1-step process of preparing thixotropic overbased calcium sulfonate complex thickened rust-inhibiting compositions wherein small amounts of water and an alcohol are incorporated into a mixture of a nonvolatile diluent oil, a calcium carbonate complex, and an oil-soluble calcium sulfonate dispersing agent. In said mixture, the calcium sulfonate dispersing agent is stated to range from about 2 to about 65 wt. %; the nonvolatile diluent oil is stated to range from about 5 to about 80 wt. %; the calcium carbonate complex is stated to range from about 1 to about 25 wt. %; and the water and alcohol are stated to range from about 1 to about 6 wt. %, and from about 1 to about 40 wt. %, respectively. In addition, the mixture of said ingredients is stated to include, optionally, up to 60 wt. % of a volatile processing solvent. The resulting mixture of ingredients is then stated to be heated under controlled conditions to convert the mixture to a rust-inhibiting composition (when cut back with a light hydrocarbon solvent). This patent points out that, to obtain the desired products, the mixture must be heated to a temperature exceeding 50° C. (122° F.), and that it is necessary in traversing the temperature zone from about 50° C. to about 100° C. (212° F.) that the rate of temperature increase not exceed a certain maximum limit where the amount of water present in the mixture is less than 2.5 moles of water per mole of calcium metal present as the carbonate complex.

U.S. Pat. No. 3,671,012 discloses a 1-step process of preparing thixotropic overbased calcium sulfonate complex thickened compositions. This is disclosed more particularly in column 6, lines 40 to the bottom of the page, extending through columns 7 and 8 and through line 25 in column 9. The procedure described in U.S. Pat. No. 3,671,012 is generally similar to that shown in U.S. Pat. No. 3,746,643, except that the disclosure in U.S. Pat. No. 3,671,012 is in somewhat greater detail than is described in U.S. Pat. No. 3,746,643.

U.S. Pat. No. 4,597,880 discloses a 1-step process to prepare thixotropic overbased calcium sulfonate thickened compositions whereby a sulfonic acid, Ca(OH)$_2$, alkanol, water and a water-soluble carboxylic acid, preferably acetic acid, are carbonated with 0.8 to 1 mole CO$_2$/mole lime within a temperature range of 95° to 200° F. until the reaction mixture is changed to a thickened composition.

U.S. Pat. No. 3,816,310 is, in numbers of respects and speaking generally, similar in its disclosure of known 1-step processes to the 1-step process disclosed in the above referred to U.S. Pat. Nos. 3,746,643 and 3,671,012 for the preparation of thixotropic overbased calcium sulfonate complex thickened compositions. Taking as illustrative the 1-step process as described in U.S. Pat. No. 3,816,310, as there described in a typical or illustrative embodiment, an admixture is formed comprising essentially an oil-soluble sulfonic acid (or a preformed oil-soluble calcium sulfonate dispersing agent prepared from said oil-soluble sulfonic acid), said sulfonic acid being preferably linear or branched chain "NAB" Bottoms or $C_{15}$-$C_{18}$ linear alkylbenzene sulfonic acids; liquid medium or carrier material, for instance, a mineral oil; a $C_1$-$C_3$ alkanol, for instance, methyl alcohol; calcium oxide and/or calcium hydroxide; and water; then carbonating the resulting admixture with carbon dioxide, while maintaining the temperature below about 165° F., to the extent that at least 1.5 moles of the carbon dioxide per mole of the calcium carbonate are present in the mixture; and then heating the carbonated admixture to a temperature above 212° F., said heating step being characterized in that the time required to heat to 212° F. is from about 0.5 to about 8 hours, the process being characterized further in that, alternatively, the water which is utilized is initially added to the other ingredients to be reacted, or, depending on certain circumstances, may be added after the carbonation step or just prior to the heating step after carrying out of the carbonation step. Numbers of nonvolatile liquid media or carrying materials are disclosed, mineral oils generally being preferred where greases are preferred. U.S. Pat. No. 3,816,310 also teaches that a light or relatively volatile hydrocarbon solvent, such as, by way of example, n-decane, benzene, toluene, Stoddard solvent or n-hexane, though not a critical ingredient, may be incorporated into the composition constituting the aforementioned ingredients, and, when included, it is preferable that it be employed in proportions, in terms of wt. %, from about 20 to 80% of the total of the calcium sulfonate and nonvolatile carrier present in the composition to be processed. In those instances in which the final composition produced by the process is to be used as a grease, a high percentage of the mixture of nonvolatile carrier and volatile hydrocarbon solvent should be volatile hydrocarbon solvent; whereas, if the final product produced by the process is to be used as a rust- or corrosion-protective coating or film, the nonvolatile carrier may be used alone as the carrier or in admixture with relatively smaller amounts of volatile carrier.

In column 10, lines 36–57, of the aforesaid U.S. Pat. No. 3,861,310, reference is made, generally, to the use of commercial equipment in carrying out the process of said patent and it makes the observation that pressure often develops in the reaction system, and that, if such occurs, the process conditions should be modified by adding the water after the carbonation step. The patent goes on to state that the pressure in commercial equipment results from the height of the liquid and also from the particular equipment used; and that, in the latter case, the vapors must be pushed through a condenser and the liquid in the liquid return line causes a resistance which is overcome by increasing the vapor pressure. The said patent also states that the pressure, in those instances in which it is encountered, causes a change in the final product in that, as the pressure is increased, the viscosity of the final product decreases, which is stated to be due to a change in the crystalline form of the calcium carbonate which is formed in the process, the desired form being calcite and the undesirable form being vaterite; that, as the pressure is increased, the amount of vaterite increases and the viscosity decreases; that this can be offset by adding the water after carbonation but below about 70° C. (158° F.), preferably below about 66° C. (150.8° F.); and that, if the water is added above about 70° C., again, more vaterite forms and the resulting lesser amount of calcite causes a decrease in viscosity. In that aspect of the process, generally described in EXAMPLE 13, column 20, and extending through columns 21 and 22 in regard to EXAMPLES 14 and 15; and in column 23, beginning at about line 28, and extending over through line 5 of column 24, wherein, after the carbonation has been completed, water is added to reduce the formation of vaterite. The carbonation is stated to be conducted over a period of 2 hours in EXAMPLE 13 at a temperature maintained in the range of 23°–36.5° C. (72.4°–97.7° F.), and, after cooling at specified cooling temperatures, the water is added over a period of 10 minutes. EXAMPLE 16 of said patent is an Example which is similar to EXAMPLE 15, and EXAMPLE 17 is an Example which is similar to EXAMPLE 16 (apart from the matter of the temperature of the water which is added after the completion of the carbonation), with the exception that EXAMPLES 16 and 17 are stated to have been conducted "under a slight pressure". U.S. Pat. No. 3,816,310 fails to disclose what particular slight pressure or pressures is or are reached in those instances in which, in carrying out the process of said patent, pressure increase may be encountered. It should, further, not go unnoticed that in said aforesaid EXAMPLES 13–17 of said patent, the amounts of methanol are inordinately greater than the small proportions thereof used in our invention as a promoter. In this same vein, it may be noted that even in the case of U.S. Pat. No. 4,579,880 (EXAMPLES 6–13), the carbonation times generally ranged from about 1 to 2 hours and failed to produce a thickened composition in 50 minutes but did in 60 minutes. Finally, again adverting to U.S. Pat. No. 3,816,310, it is recognized, for instance, that EXAMPLES 3, 6, 9 and 12 disclose carbonation times of about 15 to 20 or somewhat less minutes in the non-pressurized carbonation step of said processes, but the overall process times (prior to carbonation) for particular mixing operations or preparation times and the overall process time (excluding subsequent times as are involved in the removal of promoters and volatile hydrocarbon solvents) far exceeded the pressure-carbonation time of the premixed composition and involved an overall different process from the particular 1-step process of our invention.

The foregoing statements in U.S. Pat. No. 3,816,310, particularly that, as the pressure is increased, the viscosity of the final product decreases, which statements, apart from what has been found by us are incorrect at least as far as our present invention is concerned, are irrelevant to our particular present invention, and are devoid of any teaching or any suggestion of our present invention, as will be clear in light of the description of our present invention which is set out in detail below. The concept of the deliberate utilization of predetermined pressures at which the carbonation is conducted, particularly when utilized under controlled temperature conditions and for predetermined relatively short periods of time, when our invention is practiced, with the wholly heretofore unknown and unsuspected significant and dramatic advantages achieved by the practice of our invention, finds no counterpart in U.S. Pat. No. 3,816,310, and was totally unknown to and never envisaged by the patentee of said patent, and in no way, in our considered judgment, even remotely suggests our present invention.

It has also heretofore been known, as shown by U.S. Pat. Nos. 4,505,830 and 4,659,488, to prepare certain metal working lubricant compositions containing a major amount of a lubricating oil, generally a mineral oil, minor amounts of sulfonic acids susceptible to overbasing, lower aliphatic alcohols, oil-soluble carboxylic acids, and sulfur or active-sulfur-containing compounds. As a part of the procedure for the preparation of such compositions, a mixture containing, for example, a sulfonic acid such as an alkylbenzene sulfonic acid, sodium hydroxide or calcium hydroxide, and methanol is prepared which is blown with carbon dioxide gas. It is stated in both of these patents in column 8 thereof (lines 41-46 of U.S. Pat. No. 4,505,830) and lines 61-66 of U.S. Pat. No. 4,659,488) that the reaction or reactions involved are ordinarily carried out at atmosoheric pressure, although superatmospheric pressure often expedites said reaction or reactions and promotes optimum utilization of the reagent identified as B-1, and that the process can also be carried out at reduced pressure but, for obvious practical reasons, this is rarely done. These patents are irrelevant to our present invention in that they are directed to the production of compositions which are not thixotropic overbased calcium sulfonate complex thickened compositions; they do not disclose nor remotely suggest a 1-step process for the production of said thixotropic overbased calcium sulfonate complex thickened compositions; and, indeed, they lead away therefrom because, apart from other considerations, the compositions of said patents must be readily free-flowing non-Newtonian liquids to be effective for the intended purposes of said patents and are antithetical to the thixotropic overbased calcium sulfonate complex thickened compositions of our present invention which are generally in the form of greases or gels or pastes; and, finally, no superatmospheric pressures whatever are indicated in either of said patents. In short, said patents are irrelevant to and could not lead to even the remotest suggestion of our present invention and the improvements and advantages thereof.

BRIEF SUMMARY OF OUR INVENTION

We have discovered that by carbonating, under predetermined or controlled superatmospheric pressures, in a closed or sealed reactor, for predetermined or controlled periods of time, and advantageously under certain ranges of temperatures, a mixture of the essential ingredients of which, with or without supplemental ingredients which are not essential to our invention, comprise:

(1) An inert liquid carrier, particularly, a hydrocarbon, which may be, by way of example, n-heptane, cycloheptane, cyclohexane, n-hexane, Varsol or mineral spirits; or a nonvolatile oil, particularly a mineral oil; or mixtures of said volatile and nonvolatile liquids;

(2) A sulfonic acid which is soluble or readily dispersible in ingredient (1) and may be of the same types which are disclosed herein or others which are commonly known for use in the production of thixotropic overbased calcium sulfonate complex thickened compositions;

(3) Calcium oxide and/or calcium hydroxide;

(4) A volatile promoter exemplified most desirably by water or methanol or mixtures thereof.

In those instances in which the overbased calcium sulfonate is not formed in situ by a reaction which includes the reaction, for instance, of the volatile and/or nonvolatile solvent solution or dispersion of the sulfonic acid with the calcium oxide and/or calcium hydroxide, the calcium sulfonate may be preformed and incorporated as such into the other ingredients.

The practice of our invention makes possible the production of highly satisfactory thixotropic overbased calcium sulfonate complex thickened compositions in very short periods of time, for instance, as low as of the order of about 5 to 10 minutes carbonation time, in contrast to carbonation times commonly of 1 or 2 or more hours in known various 1-step processes, in a simple manner and without the necessity, for instance, of utilizing particular rates of additions of carbon dioxide at particular temperatures which have been characterized as being essential in certain heretofore known 1-step processes, or other special procedures.

Upon completion of the aforesaid pressure carbonation, the reactor is depressurized to atmospheric pressure and the resulting thixotropic overbased calcium sulfonate complex thickened composition may be, and commonly is, treated in accordance with conventional practices to remove the volatile promoter and the volatile carrier to the extent which may be desired.

DETAILED DESCRIPTION OF OUR INVENTION

In accordance with our present invention, as noted above, a premixture is made up of the ingredients (1), (2), (3), and (4) and placed into a reactor or formed in the reactor. The proportions of such ingredients as the carriers, whether volatile or nonvolatile, or mixtures thereof; the calcium hydroxide and/or calcium oxide; and the sulfonic acids are variable and no novelty is claimed therein as such since they are generally disclosed and taught by prior known 1-step processes. The same is, in part, true with respect to the volatile promoters, the proportions of certain of such promoters in known 1-step processes being either very high or somewhat on the low side, depending upon the particular volatile promoters utilized, the low side, for instance, being from about 1 to 6 wt. % of the reaction mixture. In the practice of our invention, it is important to use quite small proportions of the volatile promoters, generally from about 2 to about 10 wt. % of the reaction mixture, and especially from about 2 to about 5 wt. % of the reaction mixture, although our invention is not to be construed as being so limited since there is some reasonable latitude even though the proportions of the volatile promoters used in the 1-step process of our present invention are distinctly on the side of very small proportions.

The reaction mixture should be stirred or agitated either prior to being added to the reactor or stirred or agitated in the reactor, and such stirring or agitation is also advantageously carried out during the carbonation step. The reactor is of a character to safely withstand the predetermined pressure in the reactor at which the carbonation step is carried out and may, for instance, be capable of withstanding pressure of about 150 psi or substantially less as may be convenient. The reactor is provided or equipped with a suitable stirrer or agitator which may, for instance, be a mechanical stirrer; a thermocouple; an inlet port for introducing carbon dioxide gas or liquid, particularly gas, into the reactor and most desirably into the body of the ingredient contents of the reactor; a pressure gauge to measure the pressure in the reactor; and such valve means as may be convenient or necessary. The reactor is most advantageously one which is capable of being sealed and, conveniently, is capable of being readily depressurized when the carbonation is completed to the extent desired. Prior to affecting carbonation, the mixture is heated to a predetermined temperature, which is somewhat variable, as noted below, and the temperature of the reaction mixture is controlled within desired limits or ranges during the carbonation.

In prior art 1-step processes, such as are disclosed in U.S. Pat. Nos. 3,671,012; 3,746,643; and 3,816,310, and other 1-step processes, generally speaking, the temperature of the reaction mixture is adjusted to about 120° F. or somewhat slightly below or somewhat slightly above. Since carbonation is an exothermic reaction, considerable cooling, generally speaking, is applied to remove the heat generated by the carbonation reaction. In one aspect of the process of our invention, although not essential to the practice of our invention, rather than dealing with this particular disadvantage in at least various known 1-step processes, in the particularly preferred process of our present invention, we take advantage of this heat of reaction and find it unnecessary to apply cooling procedures. Rather, in this limited facet of our invention and process, we apply no cooling during the carbonation step. Because, in the practice of our invention in its particularly preferred embodiment, the reaction proceeds very rapidly, and it is not unusual to observe, for instance, up to about a 100° F. temperature increase during carbonation, by conducting an essentially non-isothermal carbonation, less energy (heat) is required, after the completion of the carbonation reaction proper, to be added later in those instances where it is desired to distill overhead the volatile promoters, such as, for instance, methyl alcohol and water, where it is desired that they be removed in whole or in part from the thixotropic overbased calcium sulfonate complex thickened composition. Generally speaking, temperatures in the range of from about 60° F. to about 350° F. can be used in the carrying out of the carbonation step of the process of our invention, although it is generally most desirable to conduct the carbonation step in our process in the range between about 100° F. and about 230° F.

In carrying out the 1-step process of our invention, it is generally desirable, but in no way essential, to adjust the temperature of the reaction mixture to about 80° to 120° F. Then, when the reactor is sealed, the contents are intimately mixed or vigorously stirred, and gaseous carbon dioxide is introduced until the reactor is pressurized by the carbon dioxide to the desired predetermined extent which, generally and most advantageously, is of the order of about 40 to about 60 psi, for instance, about 50 psi. During the time period that the pressure is maintained in the reactor, which time period is somewhat variable but is commonly for a relatively short time, usually within a time period in the range of as low as about 5 to 10 minutes and not substantially more than about 25 or 30 minutes. The temperature in the reactor rises to an extent which is variable. Generally, such rises are of the order of to about 180° to 225° F., commonly to about 200° F. At or about this stage, the reactor is depressurized and the thixotropic overbased calcium sulfonate complex thickened composition has been produced. The extent of carbonation may be from about 80 to about 100% of completion, but most desirably is about 95%.

By proper control of the process conditions, most advantageously in accordance with predetermined values or ranges, the cycle time or times required to produce a given batch of the desired thixotropic overbased calcium sulfonate complex thickened composition is reduced dramatically, as indicated above, resulting from the selected extremely short carbonation period under the aforementioned predetermined pressure conditions.

By controlling the pressure in the reactor within certain predetermined limits makes possible the carrying out of the carbonation reaction rapidly, indeed, exceedingly rapidly, thus making possible very short time periods to carry out our 1-step process, and permits, generally speaking, the use of low quantities or proportions of added volatile polar promoters to insure the desired and effective dispersion of colloidal calcite crystals.

As indicated above, carbonation or reactor pressures may be varied somewhat, but particular ranges of pressures during carbonation are critical to the most successful or optimum practice of our invention. The pressures which can be used may go as low as about 25 to 30 psi to as high as about 75 psi. Using the lower pressure values results in generally slightly increasing the carbonation time in the 1-step process of our invention. The optimum pressure is in the range of about 40 to about 60 psi, with about 50 psi being an excellent average. Pressures in excess of 80 psi offer no particular advantages. The application of the aforesaid pressure ranges is considered by us to be of importance in achieving this optimum advantage of our invention with respect to the reduction in the time period for the production of not only the formulation of the thixotropic overbased calcium sulfonate complex thickened compositions but, also, the production of such products which are satisfactory, as compositions and for uses for which heretofore known 1-step produced compositions have been emoloyed. An additional advantage of the conduct of the carbonation step under the aforesaid range of pressures is that it serves to permit a reduction in the amounts of the added polar promoters and appears to play a role in highly effectively dispersing the colloidal crystalline calcite which is formed in the process in the thixotropic overbased calcium sulfonate complex thickened compositions.

The volatile promoters which are utilized in the practice of our invention are most advantageously polar promoters which, as noted above, are, per se, well known to the art. We find it particularly advantageous in the practice of the invention of our present 1-step process to use small amounts of a volatile promoter, such as water, or a water-soluble or readily water-miscible or water-dispersible $C_1$–$C_4$ aliphatic alcohol, preferably methanol or a water-soluble or readily water-miscible or readily water-dispersible alkoxyalkanol, such as the monnomethyl ether of ethylene glycol or of diethylene glycol, and mixtures of one or more said promoters. Optionally, small amounts, generally in the range of 0.1 to 1.0 wt. % of the reaction mixture, of low molecular weight water-soluble carboxylic acids, such as acetic acid, formic acid or propionic acid, and/or oil-soluble alkyl imidazolines, such as dodecyl imidazoline or other amphipathic agents, such as n-alkyl-1,3-diamino propane, can be included in the aforementioned mixtures of ingredients prior to carrying out the carbonation under said aforementioned predetermined pressure and time conditions in those cases where very high base numbers are desired in the final thixotropic overbased calcium sulfonate complex thickened compositions.

The types of liquid carriers or solvents, volatile liquids, particular hydrocarbons, carriers or solvents; nonvolatile liquid, particularly hydrocarbons; carrier or solvents or oils; and oil-soluble sulfonic acids which can be used in the preparation of thixotropic overbased calcium sulfonate complexes in the form of thickened compositions of our present invention are, as indicated above, disclosed in the above-cited patents involving both the 2-step processes and the 1-step processes, and, for this purpose, the disclosures therein are made a part of this specification by incorporation by reference thereto. Particularly desirable volatile liquid carriers or solvents are Varsol or mineral spirits, Stoddard solvent, n-hexane, or other light or volatile liquid hydrocarbons which have a boiling point below 430° F. measured at atmospheric pressure. Particularly desirable nonvolatile liquid carriers or solvents are mineral oils having the properties of a Bright Stock cut produced in petroleum refining.

The oil-soluble sulfonic acids which are used in the practice of the invention of our present 1-step process are those which are commonly known and used in preparing thixotropic overbased calcium sulfonate complex thickened compositions and in which the colloidal calcite particles are in the form of crystals are those which are well known to the art and used in both the 1-step and 2-step prior art processes, as disclosed in the many patents in the art.

While reference has been made in various of the aforementioned patents to oil-soluble sulfonic acids which are useful in the preactice of our present invention, we prefer to utilize those which contain in their molecules an aliphatic radical having at least 12 carbon atoms, which sulfonic acids can be represented by the formula:

$$[(RA)_x-SO_3]_yM$$

wherein R is an aliphatic linear or branched chain aliphatic, generally, alkyl radical containing at least 12 carbon atoms; A is a cyclic, advantageously hydrocarbon, nucleus such as benzene, napthalene, phenanthrene, and the like; x is 1 or 2; and M is calcium or hydrogen. When M is hydrogen, y=1; and when M is calcium, y=2. As noted above, the overbased calcium sulfonates can be preformed and dissolved in the liquid medium or carrier, or said calcium sulfonates may be formed in situ therein by incorporating into the mixture of ingredients the sulfonic acid, desirably in solution in a volatile organic solvent, such as Varsol or mineral spirits, or in an oil, particularly a mineral oil, and calcium oxide and/or calcium hydroxide, most desirably calcium hydroxide. We prefer to utilize as the sulfonic acid a Varsol solution of a mixture of sulfonic acids of linear or branched chain monoalkylbenzenes and dialkylbenzenes, said sulfonic acids having a molecular weight in the range of about 450 to about 550, but there is nothing critical in the use of such sulfonic acids. In general, the preferred sulfonic acids will fall within the range of those having a molecular weight in the range of about 300 to about 650 or 700. They are, in general, commercial articles of commerce and sold by a number of chemical companies under various trade designations, and they are disclosed in numbers of the aforementioned patents.

The metal ratios of the thixotropic overbased calcium sulfonate complex thickened compositions of our invention, generally speaking, have metal ratios in the range of about 6 to 25. This is generally similar to such compositions which are produced by various of the heretofore known 1-step processes. It is known, generally speaking, that thickened compositions of the type here involved should desirably possess a metal ratio of at least about 5 or 6, and, for many uses, a metal ratio of 10 or 12 or, indeed, as high as about 25 or even somewhat greater. This is known to the art to be controlled by, among other considerations, the amount and selection of particular promoters. These matters, without regard to the bases of our present invention, are per se, known to the art and no patentable novelty is predicated broadly on procedures for producing thixotropic overbased calcium sulfonate complex thickened compositions having metal ratios such as those referred to above.

The following numbered EXAMPLES are exemplary of the production of illustrative thixotropic overbased calcium sulfonate complex thickened compositions made in accordance with the improved 1-step process of our invention. It will be understood that our invention is not limited to the specific conditions and details shown in said EXAMPLES since various changes will readily occur to those skilled in the art in light of the principles and disclosures provided in the specification and the guiding principles taught hereinabove. All temperatures are recited in °F.

EXAMPLE 1

Into a 2-liter reactor capable of being pressurized to 150 psi, and equipped with a mechanical stirrer, thermocouple and carbon dioxide inlet port to feed carbon dioxide below the surface of the liquid mixture to be placed into said reactor, there is charged into said reactor 417.4 g of a mineral spirits diluted sulfonic acid comprising 119.8 g of a mixture of sulfonic acids of predominately linear mixed mono- and di-alkyl benzenes, said mixed sulfonic acids having a molecular weight of about 465; 12.5 g of a mineral oil diluent and 181.5 g of mineral spirits. To this mixture there is added another 149 g of mineral spirits, 97.8 g Ca(OH)$_2$, 12.5 g methanol, and 7.5 g water. The reactor is sealed and stirred vigorously while the temperature is adjusted to about 120°, whereupon the carbon dioxide gas is introduced into the mixture. The pressure inside the reactor promotly increases to about 50 psi. After about 9 minutes and the temperature of the mixture reaching about 200°, the reactor is depressurized, and the contents are heated to about 260° to remove, overhead, volatile promoters which are accompanied by the removal of some of the mineral spirits. The resulting thixotropic (non-Newtonian) overbased calcium complex thickened composition, which is in the form of a grease, has the following analysis:

Wt. % Non-volatile: 50%
Viscosity #6 spindle, 10 RPM: 168,000 cps

EXAMPLES 2-5

The same procedure of EXAMPLE 1 is followed, except that the reactor is pressurized to different psi values:

| EXAMPLE | Pressure (psi) | Time (CO$_2$ mins) | I.R. Carbonate | Product |
|---|---|---|---|---|
| 2 | 30 | 20 | Calcite | Satisfactory |
| 3 | 45 | 13 | Calcite | Satisfactory |
| 4 | 50 | 9 | Calcite | Satisfactory |
| 5 | 75 | 5 | Calcite | Satisfactory |

EXAMPLE 6

The procedure of EXAMPLE 1 is followed, except that the promoter which is used is solely 20 g of water; and the temperature of the reaction mixture before the addition of the carbon dioxide is 194° and, after the addition of the carbon dioxide, is 233°. The product is the desired thixotropic overbased calcium sulfonate complex thickened composition.

EXAMPLE 7

The procedure of EXAMPLE 1 is followed, except that the promoter which is used is solely 10 g of methanol. The product is the desired thixotropic (non-Newtonian) overbased calcium sulfonate complex thickened composition, having a viscosity of 24,000 cps (#6 spindle, 10 RPM) at 40% non-volatile.

We consider that, taking all factors into account, the best embodiments of our invention, so far as we are presently aware, comprise providing a mixture of Varsol or mineral spirits, a sulfonic acid comprising a mixture of mono-alkyl and di-alkylbenzenes in which the alkyl group or groups are predominately aliphatic straight chain or branched chain containing predominately from about 15 to 18 carbon atoms, calcium hydroxide, and water or methanol or mixtures thereof; adding said mixture to a reactor; sealing said reactor; agitating or stirring said mixture, heating to between 90°–130° F., introducing carbon dioxide gas into the contents of said reactor to build up a pressure in said reactor to in the range of about 40 to 60 psi, said pressure being maintained for about 3 to 10 minutes, and without any cooling of the reactor or the contents thereof. The proportions of the ingredients are, by way of illustration, such as are shown in EXAMPLE 1.

We claim:

1. A 1-step process for preparing thixotropic overbased calcium sulfonate complex thickened compositions, the steps which comprise introducing into a reactor, which is adapted to be sealed and to withstand certain predetermined superatmospheric pressures, (1) a generally liquid mixture containing an inert liquid carrier material in the form of at least one member selected from the group consisting of volatile liquids and non-volatile liquids; (2) a sulfonic acid having an aliphatic chain containing predominately at least 12 carbon atoms; (3) at least one member selected from the group consisting of calcium hydroxide and calcium oxide; and (4) a small proportion of at least one promoter selected from the group consisting of water, $C_1$–$C_4$ water-soluble alcohol, readily water-miscible alcohol, readily water-dispersible aliphatic alcohols, water-soluble alkoxyalkanols, readily water-miscible alkoxyalkanols, and readily water-dispersible alkoxyalkanols; sealing said reactor; stirring the aforesaid contents of said reactor while maintaining said contents at a temperature a range of from about 60° F. to about 350° F., and introducing carbon dioxide into said contents in amounts to build up the pressure in said reactor to a range of about 25 to about 80 psi for a period of time to convert said reaction mixture to the desired thixotropic overbased calcium sulfonate complex thickened compositions in which the calcium carbonate content thereof is essentially in the form of colloidally dispersed particles of calcite crystals.

2. The process of claim 1, in which said inert liquid carriers are hydrocarbons.

3. The process of claim 2, in which the pressure in said reactor during the carbonation step is maintained substantially in the range between about 25 psi and about 75 psi.

4. The process of claim 3, in which the pressure is in the range of about 40 psi and about 60 psi.

5. The process of claim 4, in which the pressure in the reactor during the carbonation step is maintained for less than about 30 minutes and said reactor is then depressurized.

6. The process of claim 5, in which the pressure in the reactor during the carbonation step is maintained for between about 5 and about 20 minutes.

7. The process of claim 6, in which the pressure is in the range of about 40 to about 60 psi and is maintained for between about 5 to about 10 minutes after which the reactor is depressurized.

8. The process of claim 1, in which, after the conversion reaction, the reactor is depressurized and the contents are subjected to distillation to remove at least most of the promoters.

9. The process of claim 2, in which the sulfonic acid is a member selected from the group of sulfonic acids of mono- and di-alkyl benzenes and the molecular weight of said sulfonic acids is in the range of about 300 to about 700.

10. The process of claim 9, in which the molecular weight of said sulfonic acids is in the range of about 450 and about 550.

11. The process of claim 1, in which the promoter is a member selected from the group consisting of water, methanol, and mixtures thereof.

12. The process of claim 11, in which the contents of the reactor is maintained at a temperature in the range between about 100° and about 230° F.

13. The process of claim 2, in which the weight of the promoter in the contents of the reactor constitutes from about 2 to about 10 wt. % of said contents.

14. The process of claim 13, in which, after the conversion of the contents of said reactor to the desired thixotropic overbased calcium sulfonate complex thickened composition has occurred, said reactor is depressurized and the composition is distilled to remove at least most of the promoters.

15. In a 1-step process for preparing a thixotropic overbased calcium sulfonate complex in the form of a thickened composition wherein there is introduced into a reactor, which is adapted to be sealed and to withstand certain predetermined pressures, an essentially liquid mixture containing an inert liquid carrier in the form of at least one member selected from the group consisting of volatile liquids and nonvolatile liquids; a sulfonic acid containing predominately at least 12 aliphatic carbon atoms; a volatile promoter selected from the group consisting of water, $C_1$–$C_4$ water-soluble alcohol, readily water-miscible alcohol, readily water-dispersible aliphatic alcohols and alkoxyalkanols; and wherein said reactor is sealed and stirred and the contents of said reactor are heated and maintained at a temperature in the range of from about 60° F. to about 350° F., the improvement which comprises introducing carbon dioxide into said contents in amounts to build up the pressure in said reactor to a pressure in the range of about 25 psi to about 75 psi for a period of time, not to exceed about 30 minutes, to convert said reaction mixture to the desired thixotropic overbased calcium sulfonate complex thickened composition in which the calcium carbonate content thereof is in the form of colloidally dispersed particles of calcite crystals.

16. The process of claim 15, in which the liquid carriers are hydrocarbons.

17. The process of claim 16, wherein the pressure in said reactor is built up to a pressure in the range between about 25 psi to about 75 psi for a period of time in the range of about 5 to about 30 minutes.

18. The process of claim 17, wherein the contents of the reactor are maintained at a temperature in the range of about 100° F. to about 230° F. during the carbonation step.

19. The process of claim 18, wherein the pressure is maintained for a period of time in the range of about 5 to about 15 minutes.

20. The process of claim 17, in which the promoter is a member of the group consisting of water and methyl alcohol and mixtures thereof and is present in said reaction mixture during the carbonation step in the range between 2 wt. % and 10 wt. % of the reaction mixture.

21. In a 1-step process for preparing thixotropic overbased calcium sulfonate complex thickened compositions, the steps which comprise introducing into a reactor, which is adapted to be sealed, a generally liquid mixture containing an inert liquid solvent carrier solution of a calcium sulfonate dispersing agent; at least one member selected from the group consisting of calcium hydroxide and calcium oxide; a small proportion of at least one promoter selected from the group consisting of water, $C_1$–$C_4$ water-soluble, readily water-miscible and water-dispersible aliphatic alcohols and alkoxyalkanols, said promoter constituting from about 2 to about 10 wt. % of the contents of said reactor; sealing said reactor; stirring the contents of said reactor while heating and maintaining said contents at a temperature in the range of from about 60° F. to about 350° F., and introducing carbon dioxide into said contents in amounts to build up the pressure in said reactor to a the range of about 25 to below 80 psi for period of time to convert said reaction mixture to the desired thixotropic overbased calcium sulfonate complex thickened composition in which the calcium carbonate content thereof is essentially in the form of colloidally dispersed particles of calcite crystals.

22. The process of claim 21, in which the inert liquid carriers are hydrocarbons.

23. The process of claim 22, in which the pressure built up in said reaction by the introduced carbon dioxide is in the range of about 40 to 60 psi and the time in which the carbonation step is conducted is in the range of from about 5 to about 20 minutes.

* * * * *

UNITED STATES PATENT AND TRADEMARK OFFICE
CERTIFICATE OF CORRECTION

PATENT NO. : 4,824,584

DATED : April 25, 1989

INVENTOR(S) : Ron Muir and Kevin L. Mulrooney

It is certified that error appears in the above-identified patent and that said Letters Patent is hereby corrected as shown below:

In Column 12, line 58 (Claim 15, line 13), after "and" insert:

at least one member selected from the group consisting of calcium hydroxide and calcium oxide; and

Signed and Sealed this
Twelfth Day of December, 1989

*Attest:*

JEFFREY M. SAMUELS

*Attesting Officer*      *Acting Commissioner of Patents and Trademarks*